UNITED STATES PATENT OFFICE.

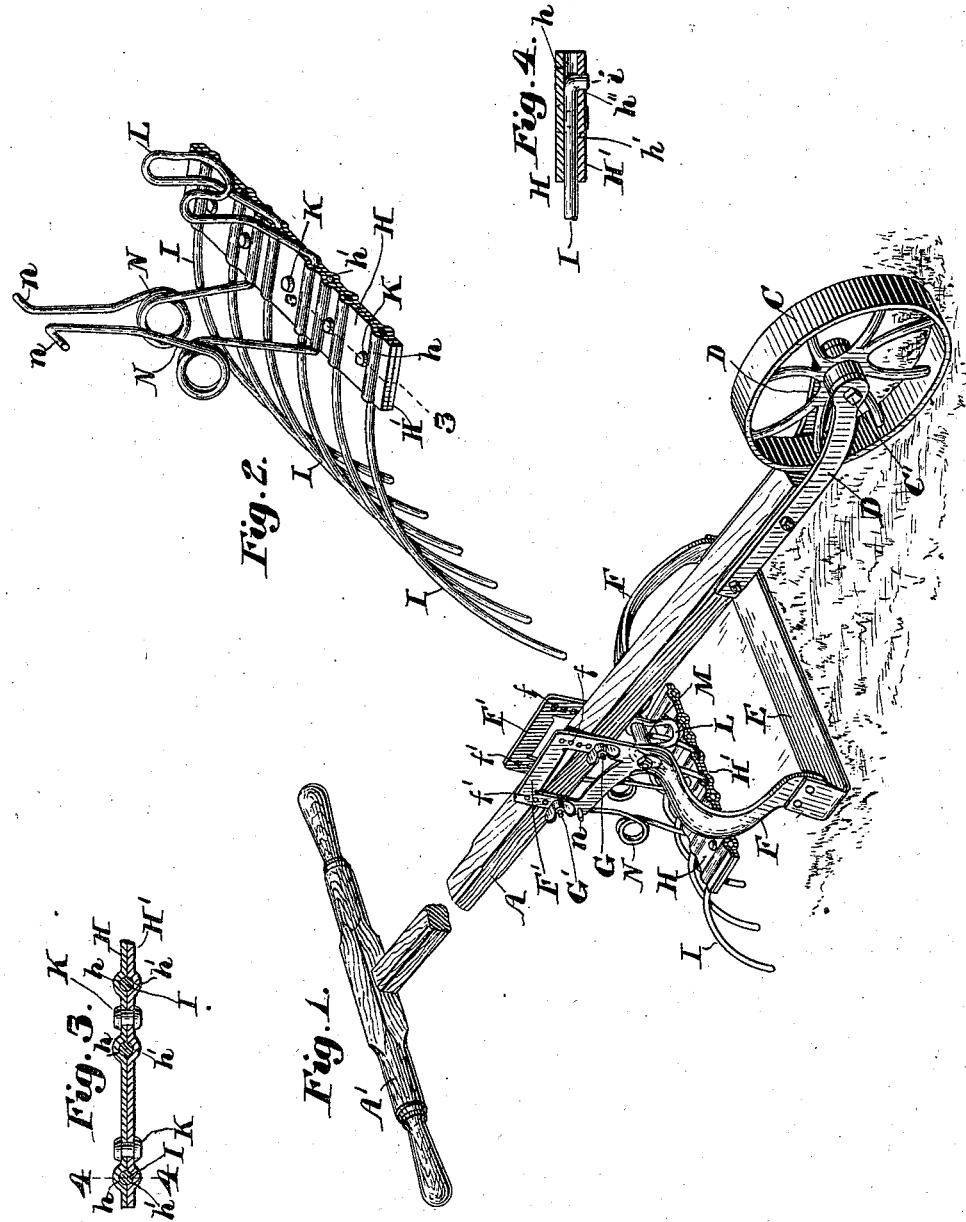

SOLOMON FULLER, OF DANVERS, MASSACHUSETTS, ASSIGNOR TO FULLER FARM TOOL MANUFACTURING COMPANY, OF DANVERS, MASSACHUSETTS, A CORPORATION OF NEW JERSEY.

WHEEL-WEEDER.

SPECIFICATION forming part of Letters Patent No. 724,175, dated March 31, 1903.

Application filed June 26, 1902. Serial No. 113,320. (No model.)

*To all whom it may concern:*

Be it known that I, SOLOMON FULLER, a citizen of the United States, and a resident of Danvers, in the county of Essex and State of Massachusetts, have invented certain new and useful Improvements in Wheel-Weeders, of which the following is a specification.

This invention relates to improvements on the patent for wheel-hoes granted to me April 29, 1890, No. 426,639; and it consists, in combination with a wheel-hoe, of a pulverizing device, preferably detachably secured thereto for the purpose of pulverizing the earth and destroying the weed-seeds that may be near or on the top of the earth that is being weeded.

The invention is carried out as follows, reference being had to the accompanying drawings, wherein—

Figure 1 is a perspective view of the improved wheel-weeder, showing the pulverizing device attached to the same. Fig. 2 is a perspective view of the pulverizing device, shown as detached from the wheel-hoe. Fig. 3 is a section of the prong-holder on the line 3 3, shown in Fig. 2; and Fig. 4 is a cross-section on the line 4 4, shown in Fig. 3.

Similar letters refer to similar parts wherever they occur on the different parts of the drawings.

In the drawings, Fig. 1, A represents the bar, having a suitable handle A' in its upper end and provided in its lower end with a wheel C, journaled on a pin or bolt C', passing through perforations in plates D D, secured to the lower end of the bar A in a manner similar to that shown in my patent aforesaid.

E is the weeder-blade, preferably secured to a forked blade-support F F, terminating in its upper ends as adjustable fulcrum plates or frames F' F'', provided with perforations *f f'*, adapted to receive fastening-bolts G G', that pass through perforations in the bar A, and provided with fastening-nuts, by which arrangement the weeder-blade may be adjusted in position both as to depth and pitch substantially like that shown and described in my above-mentioned patent. In connection with said wheel-hoe I use a pulverizing device, which is constructed as follows: It consists of a prong-holding frame, which is composed of a pair of bars H H', which are made of wood or metal, as may be most desirable or practicable. Said bars H H' are provided at intervals with preferably semi-circular lateral recesses or grooves *h h'*, adapted to receive the upper ends of the pulverizing curved prongs I I I, the front ends of which are bent at a right angle, as shown at *i* in Fig. 4, and adapted to fit into a vertical perforation *h''*, preferably in the lower prong-holding portion H', as shown in said Fig. 4. The bars H H' are clamped together by means of rivets or screw-bolts K K, and by such arrangement and construction the prongs I I are firmly secured to said prong-holding frame and prevented from turning sidewise while in use. By thus attaching the prongs to the clamping-bars I am enabled to remove any one of said prongs, if broken, simply by detaching the bars H H', removing the broken prong or prongs, and replacing such by new ones and clamping them in position between the bars. The said prong-holder may be permanently attached to the weed-holder or made detachable from it, and in practice I prefer to make it detachable, so that the weeder may be used with or without the pulverizer, and for such purpose I provide the forward end of the clamping-bars H H' with a suitable (preferably duplex) hook L, adapted to be hooked onto a transverse bolt M, secured to the plates or frames F' F'. (Shown in Fig. 1.)

The rear portions of the clamping-bars H H' are provided preferably with spring-metal yielding and upwardly-projecting rods N N, having angular upper ends *n n*, adapted to interlock into the lower perforations *f' f'* on the frames F' F', as shown in Figs. 1 and 2. By thus connecting the pulverizing device in a yielding manner to the wheel-hoe, its prongs I I being also somewhat elastic and yielding, said prongs will yield to inequalities or obstructions in the ground—such as, for instance, stones.

Having thus fully described the nature, construction, and operation of my invention,

I wish to secure by Letters Patent and claim—

In combination with a wheeled carrier, a yielding pulverizer device, consisting of detachable clamping-bars H, H', provided with a series of yielding prongs I, I, yielding supports N, N, attached to said clamping-bars, and means for securing the latter to the frame substantially as and for the purpose set forth.

In testimony whereof I have affixed my signature in presence of two witnesses.

SOLOMON FULLER.

Witnesses:
ALBAN ANDRÉN,
HELEN T. ANDRÉN.